United States Patent [19]

Korner et al.

[11] Patent Number: 5,295,075
[45] Date of Patent: Mar. 15, 1994

[54] METHOD AND APPARATUS FOR MACHINING WORKPIECES WITH NUMERICALLY CONTROLLED MACHINES

[75] Inventors: Klaus-Dieter Korner, Traunstein; Norbert Vollmayr, Traunwalchen, both of Fed. Rep. of Germany

[73] Assignee: Johannes Heidenhain GmbH, Traunreut, Fed. Rep. of Germany

[21] Appl. No.: 765,562

[22] Filed: Sep. 25, 1991

[30] Foreign Application Priority Data

Sep. 25, 1990 [EP] European Pat. Off. ........ 90118385.5

[51] Int. Cl.$^5$ ............................................. G06F 15/46
[52] U.S. Cl. .......................... 364/474.28; 364/474.24; 364/474.35; 364/474.18
[58] Field of Search ...................... 364/474.18, 474.24, 364/474.28, 474.29, 474.31, 474.35, 191

[56] References Cited

U.S. PATENT DOCUMENTS

| | | |
|---|---|---|
| 3,629,558 | 12/1971 | Coggin . |
| 3,927,948 | 12/1975 | Cox et al. . |
| 4,031,369 | 6/1977 | Heaman et al. . |
| 4,127,849 | 11/1978 | Okor . |
| 4,162,527 | 7/1979 | Kilbane et al. . |
| 4,275,449 | 6/1981 | Aish . |
| 4,503,493 | 3/1985 | Burkhardt et al. . |
| 4,536,848 | 8/1985 | d'Entremont et al. . |
| 4,550,383 | 10/1985 | Sugimoto . |
| 4,551,810 | 11/1985 | Levine . |
| 4,575,791 | 3/1986 | Schwefel . |
| 4,586,145 | 4/1986 | Bracewell et al. . |
| 4,618,924 | 10/1986 | Hinds .............................. 364/474.18 |
| 4,704,688 | 11/1987 | Kamata . |
| 4,706,200 | 11/1987 | Kishi et al. . |
| 4,757,461 | 7/1988 | Stöhr et al. . |
| 4,791,579 | 12/1988 | Kranitzky . |
| 4,792,889 | 12/1988 | Krägelin et al. . |
| 4,833,617 | 5/1989 | Wang . |
| 4,837,703 | 6/1989 | Kakazu et al. ................. 364/474.18 |
| 4,841,430 | 6/1989 | Nakagawa et al. . |
| 4,868,761 | 9/1989 | Hayashi . |
| 4,870,597 | 9/1989 | Seki et al. . |
| 4,879,667 | 11/1989 | Gorski et al. . |
| 5,101,363 | 3/1992 | Rutkowski . |
| 5,103,150 | 4/1992 | Sasaki et al. . |

FOREIGN PATENT DOCUMENTS

| | | |
|---|---|---|
| 0083836 | 11/1982 | European Pat. Off. . |
| 0117614 | 1/1984 | European Pat. Off. . |
| 0121100 | 2/1984 | European Pat. Off. . |
| 0144585 | 9/1984 | European Pat. Off. . |
| 3401060 | 1/1986 | Fed. Rep. of Germany . |
| 7130870 | 4/1972 | France . |
| 0145967 | 6/1985 | Japan . |
| 0175792 | 4/1986 | Japan . |
| 2140937 | 12/1984 | United Kingdom . |

OTHER PUBLICATIONS

Sungurtekin, U., et al., "Graphical Simulation and Automatic Verification of NC Machining Programs," *1986 IEEE International Conference on Robotics and Automation*, vol. 1, pp. 156–165.
Wang et al.; Geometric Modeling for Swept Volume of Moving Solids; Dec., 1986, pp. 8–17, IEEE CG & A.
Proceedings of the 1966 IEEE International Conference on Robotics and Automation, vol. 1, Apr. 1986, New York U.S., pp. 156–165; Sungurtekin & Voelcker; "Graphical Simulation and Automatic Verification of NC Machine Programs."
General Electric Technical Information Series, May 1984, W. Wang, "Solid Geometric Modeling for Mold Design and Manufacture," pp. 1–30.
The Polygon Package, E. E. Barton and I. Buchanan, vol. 12, No. 1, Jan. 1980.
Pioneering in Technology, Proceedings 17th Numerical Control Society Annual Meeting and Technical Conference, Apr. 27, 1980.

*Primary Examiner*—Jerry Smith
*Assistant Examiner*—Steven R. Garland
*Attorney, Agent, or Firm*—Willian Brinks Hofer Gilson & Lione

[57] ABSTRACT

A method and apparatus for assembling workpieces from base bodies that are easily definable. Corrections for the tool path, i.e. cutter radius correction, are already performed on the base bodies or their 2-D contours, so that upon the assembling of the corrected base bodies to make workpieces, the corrected contours already intersect, thus in a simple way producing the tool path data.

15 Claims, 32 Drawing Sheets

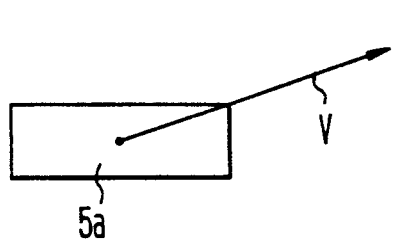 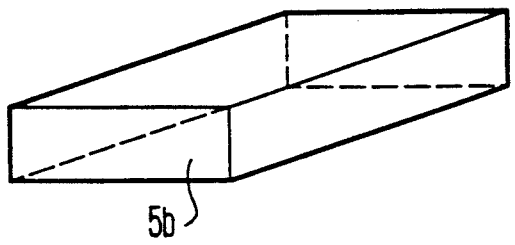
Fig.3A    Fig.3B
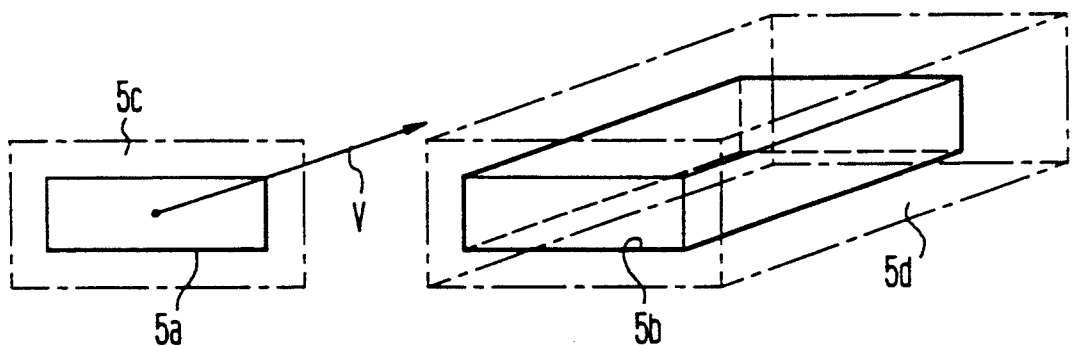
Fig.3C    Fig.3D

Fig. 8a

Form cutting program for mathematically defined shapes

| Pickup of machining parameters and body definition (Boolean linkage equation) |

2
Ascertaining all incident hollow and solid bodies (basic bodies) from the Boolean linkage equation Pickup of type, location and generating contour of each basic body if (type requires recution to a plurality of basic bodies)

| ——— then ——— | ——— else ——— |
| then generation of the data of the reduced basic bodies (bodies generated by translation and rotation) | for (all basic bodies) | for (all basic bodies)

if (hollow body)

| ——— then ——— | ——— else ——— |
| then calculation of the correction of the generating contour for hollow bodies (correction inward) | else calculation of the correction of the generating contour for solid bodies (correction outward) | for (all corrected generating contours)
    calculation of the overcut-free corrected contours for (all corrected contours)
    linearization of all incident circles current machining face = face of blank at which the machining is to be begun

3
Calculating the intersecting line contours of all basic bodies defined by type, location and correct generatrix, with the current machining plane Ascertaining the corrected cutting paths for the current machining face.

Fig. 8b

```
| if (machining of the height lines)                                          |
|    |————then————————————————————else————————————————|
|    | ::::::::::::::::::#13:::::::::::::::::::: ::::::::::::::::::#17:::::::::::::::::::: |
|    | Machining of height lines by      Machining layer line by              |
|    | scanning line method              scanning line method                 |
|                                                                             |
|    | Shift in the current machining face by one setting                     |
|                                                                             |
| while (current machining face still not the face of the blank at            |
| which the machining is to be ended)                                         |

| End of cutting program                                                      |

| Contour projection ()                                                       |
|    | Read the description of a primitive out of the memory for shapes      |
|    | if (no primitive present)                                              |
|    |    |————then————|————————————else————————————|
|    |    | end matching | ::::::::::::::::#18::::::::::::::::::::::::::::::: |
|    |    | of the bodies| Calculate global parameters for contour           |
|    |    |              | projection, such as solid angle of the            |
|    |    |              | primitive, location of the machining plane,       |
|    |    |              | etc., from the parameters of the primitive        |
|    |    |              |                                                   |
|    |    |              | if (body generated by rotation)                   |
|    |    |              |   |————then————————|————else————————|
|    |    |              |   | :::::::::#20::::::::: :::::::::#23::::::::: |
|    |    |              |   | Calculate the contour  Calculate the output  |
|    |    |              |   | resulting from inter-  contour that results  |
|    |    |              |   | section of the         from the intersection |
|    |    |              |   | machining plane by the of the machining plane|
|    |    |              |   | body generated by      by the body generated |
|    |    |              |                                                   |
|    |    |              | Write the contour(s) generated in the output      |
|    |    |              | contour memory                                    |
```

Fig. 9

Ascertaining all incident hollow and solid bodies (basic bodies) from the Boolean linkage equation

---

Ascertaining all incident hollow and solid bodies (basic bodies) from the Boolean linkage equation The function "test vz" furnishes value (hollow or solid) and is called up with the pointer to the root of the tree Test vz (i = index of the point to the tested; node = pointer on node).

> The function proceeds with all the set theory operations (union, difference, section) for each page node, beginning at the page node, to the root of the tree.
>
> If the value of the page node is negative, the body is a hollow body having the contour to be generated, having the quantity number.
>
> If the current node is the right-hand node after a differentiation operation, the sign of the value must be inverted (solid body from hollow body and vice versa).
>
> For the root of the tree, the sign of the number tells whether a page node is used as a hollow body or as a solid body.
>
> All the incident hollow and solid bodies are entered on the list of basic bodies.

Fig. 10

Calculating the intersecting line contours of all basic bodies defined by type, location and corrected generatrix, with the current machining plane

```
Contour projection ()

Read the description of a primitive out of the memory for
    shapes if (no primitive present)
        ——then——                  ——else——
        end machining             #4
        if the bodies             Calculate global parameters for contour
                                  projection, such as solid angle of the
                                  primitive, location of the machining
                                  plane, etc., from the parameters of
                                  the primitive if (body generated by rotation)
                                      ——then——              ——else——
                                      #6                    #9
                                      Calculate the con-    Calculate the output
                                      tour resulting        contour that results
                                      from intersection     from the intersection
                                      of the machining      of the machining
                                      by the body gener-    plane by the body
                                      ated by rotation      generated by trans-
                                                            lation.

Write the contour(s) generated in the
                                  output contour memory
```

Fig. 11

Calculate global parameters for contour projection, such as solid angle of
the primitive, location of the machining plane, etc., from the parameters
of the primitive

| Determine distance of the machining plane from the origin | |
|---|---|
| Calculate the transformation matrix that executes the copying of the primitive coordinates into the tool coordinate system | |
| then | else |
| if (axis of rotation parallel to machining plane) | ▓▓▓▓▓▓▓▓#5▓▓▓▓▓▓▓▓ This relates to a body generated by translation |
| then: set parallel flag / else: erase parallel flag — Calculate the parameters that are needed for the line interpolation of second order curves | |
| Calculation of the starting angle of rotation and ending angle of rotation of the rotation operation | |

Fig. 12

This relates to a body generated by translation

| if (displacement vector of the body generated by translation parallel to normal vector of the machining plane) | | | |
|---|---|---|---|
| then | else | | |
| set status flag = 1 | if (machining plane parallel to contour plane) | | |
| | then | | else |
| | if (displacement vector is located in the contour plane) | | status flag = 1, i.e., normal machining algorithm |
| | then | else | |
| | status flag = 3, i.e., there is no solution | if (ending point of the displacement vector is located in the machining plane) | |
| | | then | else |
| | | status flag = 2, i.e., there is no solution | status flag = 3, i.e., contour itself is the solution |

Fig. 13

Calculate the contour resulting from intersection of the machining plane by the body generated by rotation

| if (status flag = 1) | |
|---|---|
| ————then———— | ————else———— |
| ░░░░░░░░░░░░#7░░░░░░░░░░░░ | ░░░░░░░░░░░░#8░░░░░░░░░░░░ |
| The output contour, which is the outcome of the intersection of the machining plane and the body generated by rotation, is a generalized conical section | The output contour comprises one or more circles, because the normal vector of the machining plane and the axis of rotation of the body generated by rotation are parallel |

Fig. 14a

The output contour, which is the outcome of the intersection of the machining plane and the body generated by rotation, is a generalized conical section

---

Retrieve the starting point ka of the generating contour from the input contour memory

---

Check whether the circular path of the starting point that is created if the point is rotated about the axis of rotation intersects the machining plane

--- while (retrieve next point, if available, from the input contour memory)

---

Check whether the circular path of the new point intersects the machining plane

--- if (neither starting nor ending point intersect it)

then ─────────────────────────── else ─────────────────────────── if (starting point does not intersect it)

then ─────────────────── else ───────────────────

| Calculate the point on the straight line between the starting and ending points on the input contour that just barely still intersects it. This becomes the new starting point | Calculate the point on the straight line between the starting and ending points on the input contour that beyond which the machining plane is no longer intersected this becomes the new ending point | if ( (second order curve results)

then ─────────────────── else ───────────────────

| Solution set is again a vector in the machining plane. The starting and ending point is transformed into the machining plane and then output into the output contour memory | Solution set is a second order curve. This curve is linearized by the process of interpolation between the transformed starting and ending point within the machining plane.    III |

---

Set input contour starting point - input contour ending point
Set output contour starting point - output contour ending point

Fig. 14b

```
Interpolate (ka = starting point; ke = ending point, para = curve
parameters)
    Read starting and ending points (ka, ke) and curve parameters of the
    second order curve
    Determine the interpolating straight line that connects the starting
    point to the ending point
    Calculate the maximum deviation eps as well as the coordinates of the
    point kmax on the curve where the maximum deviation occurs
    if (eps less than current resolution)
    ├──────────then──────────┬──────────else──────────┤
    │ Write the ending point of the │ Interpolate (ka, kmax, para) │
    │ interpolating straight line into ├────────────────────────────────┤
    │ the contour memory            │ Interpolate (kmax, ke, para) │
```

Fig. 15

The output contour comprises one or more circles, because the normal vector of the machining plane and the axis of rotation of the body generated by rotation are parallel Retrieve the starting point ka of the generating contour from the input contour memory Check whether the circular path of the starting point that is created if the point is rotated about the axis of rotation intersects the machining plane while    (retrieve next point, if available, from the input contour memory)

Check whether the circular path of the new point is located above/below or in the machining plane if (starting intersects it but ending point does not, or vice versa)
    ————————then————————————else—
    Calculate the point on the vector, which is defined by the starting and ending point, that generates a circular path that is located in the machining plane if (A circle exists that is located in the machining plane)
    ————————then————————————else—
    Calculate the circus radius, direction of revolution and opening angle, and output this variables to the contour memory Set input contour starting point = input contour ending point

Fig. 16

Calculate the output contour that results from the intersection of the machining plane by the body generated by translation

```
Switch (status flag)                                              olh
    Case 0:
        ═══════════════════════#10═══════════════════════
        This is a normal location, i.e. a location of the body
        generated by translation that does not lead to any
        singularities of the equations case 1:
        ═══════════════════════#11═══════════════════════
        In this case, the normal vector of the machining plane is
        parallel to the displacement vector of the body generated
        by translation case 2:
        ═══════════════════════#12═══════════════════════
        The machining plane is parallel to the plane in which the
        generating contour of the body generated by translation is
        located, i.e., the generating contour is transformed into
        the machining plane by parallel displacement default:
        No solution set
```

Fig. 17

It is a matter of a normal lay, i.e. of a lay of the translation body that leads to no singularities of the equations.

```
Retrieve the starting point ka of the generating contour from the
input contour storer.

Examine whether the vector of the starting point that arises when
one shifts the point in correspondence to the shift vector
(Verschiebungsvektor) cuts the processing plane.

while (retrieve, if present, next point out of the input contour
storer)

Examine whether the vector of the new point cuts the processing
    plane if (cuts neither starting nor end point)
    ┌──────── then ────────────────────────────────── else ────────┐
    │                                                              │
    │   if (starting point does not cut)                           │
    │   ┌──────── then ──────────────┬──────── else ──────────┐    │
    │   │ then calculate the point on│ else calculate the point│   │
    │   │ the straight line between  │ on the straight line be-│   │
    │   │ starting and end point of  │ tween starting and end  │   │
    │   │ the input contour which    │ point of the input con- │   │
    │   │ barely still cuts. This    │ tour from which the pro-│   │
    │   │ becomes the new starting   │ cessing plane is no     │   │
    │   │ point.                     │ longer cut. This becomes│   │
    │   │                            │ the new end point.      │   │

Calculate the section point with the processing plane and
    give out the point into the output contour storer.

Set input contour starting point = input contour end point
```

Fig. 18

In this case the normal vector of the processing plane is parallel to the shift vector of the translation body.

---

Retrieve the starting point ka of the generating contour from input contour storer.

Examine whether the vector of the starting point that arises when one shifts the count in correspondence to the shift vector lies in/under or over the processing plane.

while (retrieve, if present, next point out of the input contour storer)

Examine whether the vector of the new point lies in the processing plane, or over it or under it.

if (a section point with the processing plane exists)

——————— then ——————————————— else ———

Calculate the puncture point of the vector through the processing plane and put the point(s) into the output contour storer.

Set  Input contour starting point = Input contour end point

The processing plane is parallel to the plane in which the generating contour of the translation body lies, i.e. the generating contour is transformed into the processing plane by parallel shifting.

--- while (Retrieve, if present, all points from the input contour storer)

Calculate the parallel shift of the point from the contour plane into the processing plane.

Fig. 20a

Elevation line processing with can line process

| Elevation line processing with scan line process |
|---|

| if (Processing surface = upper boundary surface of the blank) | |
|---|---|
| ———— then ———— | else ———— |
| Calculation of minimum and maximum abscissa value of the section contours | |

Begin with actual scan line = scan line through minimum abscissa value

| | Calculation of the section points of the actual scan line with the section contours |
|---|---|
| | Order section points according to ordinate value in point array |
| | #14 Test Boolean linkage equation |
| | if (Section point satisfies the Boolean linkage equation) |
| | ———— then ———— else ———— |
| | Point valid / Point not valid (eliminate point in the point array) |
| | if (Processing plane not upper border surface of the blank) |
| | ———— then ———— else ———— |
| | Form mask / Form mask of the inner ranges of the scan line of the actual processing plane |
| | Form mask of the inner ranges of the corresponding scan line (equal value of the abscissa) of the preceding processing plane |
| | for (all section points of the actual processing plane) |
| | | if (point of the scan line of the actual plane in the inner range of the mask of the scan line of the preceding plane) |
| | | ———— then ———— else ———— |
| | | valid point / not valid point (eliminate point in the point array) |
| | | if (point of the scan line of the preceding plane in the inner zone of the mask of the scan line of the actual plane) |
| | | ———— then ———— else ———— |
| | | valid point / not valid point (eliminate point in the point array) |

Fig. 20b

```
Entry of the points in storer for the valid points of all scan
lines
Shift of the actual scan line by a point resolution
while (abscissa value of the scan line < maximum abscissa value);
    1.  Seek out border point from minimum abscissa value
        From the actual point in the adjacent scan lines and in the
        actual scan line seek the following border bound and compose
        the contour
    while (following border point not starting point of the contour
    issue milling-tool path to the starting point of the contour
    issue milling-tool path along the contour
    issue milling-tool path from the end point to safety height
while (points in the storer of the scan line points);
```

Fig. 21

Test Boolean linkage equation

---

Test Boolean linkage equation
The Boolean linkage equation is stored in the form of a binary tree that must be run rough in post or sequence.
Each node contains the information data left-pointer, right-pointer and a value which specifies the type of operation (allocation, combining, section or difference).
If it is a matter of a leaf node, the value gives the number of the base body.

---

The function test-bool delivers value (inside, outside or on the border of the contour) and is called up with the pointer on the root of the tree and (with) the index of the point into the point array.
Test-bool (i = index of the point to be tested, node = pointer on node)

--- if (leef noted ((point on left sequence node = nil-pointer) && (pointer on right sequence node = nil-pointer)))

| then | else |
|---|---|
| #15  Test of the actual point in respect to the section line of the base body with the number of the leaf node | Test nodes (i, node>left) |
| | Result of test nodes = left value (INSIDE, OUTSIDE, BOUNDARY) |
| | test nodes (i, node $\lambda$ to the right) |
| Result of the test scan is returned is as function value (INSIDE, OUTSIDE, or BOUNDARY) | Result of the test nodes = right value (INSIDE, OUTSIDE, BOUNDARY) |
| | #16  Test of the linkage state from the state of the left and right succession node and the linkage operation |
| | Result of the test operation is returned as function value (INSIDE, OUTSIDE or BOUNDARY) |

Fig. 22

Test of the actual point with respect to the section line of the base body with the number of the leaf node Test scan returns the value (INSIDE, OUTSIDE OR BOUNDARY).
Input parameters are the index of the point (offset in the array of the ordered scan points and the number of the primitive.
test scan (i = index in array, nr)

| if (point = boundary point of the base body) | |
|---|---|
| then | else |
| deliver function value BORDER | Count points in the array that lie to the left of the point with index i and are points of the base body with number i |
| | Count points in the array that lie to the right of the point with index i and are points of the base body with number i |
| | if the number of points that lie to the left is even-numbered && the number of points that lie to the right is likewise even-numbered deliver function value OUTSIDE |
| | if the number of points that lie to the left is odd && the number of points that lie to the right is likewise odd deliver function value INSIDE |
| | otherwise deliver function value BOUNDARY |

Fig. 23

```
Test of the linkage state from the state of the left and right succession
mode and the linkage operation Test operation returns the result (INSIDE, OUTSIDE or BOUNDARY).
Input parameters are the type of operation, the left value (INSIDE,
OUTSIDE or BOUNDARY) and the right value (INSIDE, OUTSIDE or BOUNDARY).
Test operation (op, left value, right value)

switch (op)

case UNIFICATION:

Left value:          Right value:          Function value:

OUTSIDE      &&      OUTSIDE         =     OUTSIDE
        INSIDE       &&      OUTSIDE         =     INSIDE
        BOUNDARY     &&      OUTSIDE         =     BOUNDARY
        INSIDE       &&      INSIDE          =     INSIDE
        BOUNDARY     &&      INSIDE          =     INSIDE
        OUTSIDE      &&      INSIDE          =     INSIDE
        INSIDE       &&      BOUNDARY        =     BOUNDARY
        BOUNDARY     &&      BOUNDARY        =     INSIDE
        BOUNDARY     &&      BOUNDARY        =     BOUNDARY case DIFFERENCE:

Left value:          Right value:          Function value

OUTSIDE      &&      OUTSIDE         =     OUTSIDE
        INSIDE       &&      OUTSIDE         =     OUTSIDE
        BOUNDARY     &&      OUTSIDE         =     OUTSIDE
        OUTSIDE      &&      INSIDE          =     INSIDE
        INSIDE       &&      INSIDE          =     OUTSIDE
        BOUNDARY     &&      INSIDE          =     BOUNDARY
        OUTSIDE      &&      BOUNDARY        =     BOUNDARY
        INSIDE       &&      BOUNDARY        =     OUTSIDE
        BOUNDARY     &&      BOUNDARY        =     BOUNDARY case SECTION:

Left value:          Right value:          Function value

OUTSIDE      &&      OUTSIDE         =     OUTSIDE
        INSIDE       &&      OUTSIDE         =     OUTSIDE
        BOUNDARY     &&      OUTSIDE         =     OUTSIDE
        OUTSIDE      &&      INSIDE          =     OUTSIDE
        INSIDE       &&      INSIDE          =     INSIDE
        BOUNDARY     &&      INSIDE          =     BOUNDARY
        OUTSIDE      &&      BOUNDARY        =     OUTSIDE
        INSIDE       &&      BOUNDARY        =     BOUNDARY
        BOUNDARY     &&      BOUNDARY        =     BOUNDARY
```

Fig. 24

Layer line processing with scan line process

| Layer line processing with scan line process |
|---|

| Calculation of minimum and maximum abscissa value of the section contours |
|---|

| Set actual scan line = scan line through minimum abscissa value |
|---|

| Calculation of the section points of the actual scan line with the section contours |
|---|
| Order section points according to ordinate values in point array |
| Test Boolean linkage equation |

| if (section point satisfies the Boolean linkage equation) | |
|---|---|
| ————then———— | ————else———— |
| point valid | point not valid (eliminate point in the point array |

| if (point below the upper edge of blank) | |
|---|---|
| seek next-lower point under upper edge of blank in the point array | point coordinate = upper edge of blank |

| if (point coordinate under the lower edge of blank) | |
|---|---|
| ————then———— | |
| point coordinate = lower edge of blank | point coordinate = valid |

| Issue milling-tool path to the point |
|---|
| Shift of the actual scan line by one pint resolution |

| while (abscissa value of the scan line < maximum abscissa value ); |
|---|

| issue milling-tool path a safety height |
|---|

Fig. 25

From the parameters of the primitive calculate the global parameters of the contour projection, such as steric angle of the primitive, lay of the processing plane, etc.

| Determine distance of the processing plane from the origin. |||
|---|---|---|
| Calculate the transformation matrix that the imaging of the primitive coordinates executes into the tool coordinate system. |||
| then || else |
| If (axis of rotation parallel to the process plane) || ▓▓▓▓▓▓#19▓▓▓▓▓▓ It is a matter of a translation body |
| then | else | |
| set parallel flag | Extinguish parallel flag  Calculate the parameters that are needed for the line interpolation of curves of the 2nd order | |
| Calculation of the start rotary angle and of the final rotary angle of the rotation || |

Fig. 26

It is a matter of a translation body

| if (shift vector of the translation body parallel to the normal vector of the processing plane) |||||
|---|---|---|---|---|
| then | else ||||
| Set stage flag = 1 | if (processing plane parallel to the contour plane) ||||
| | then ||| else |
| | if (The shift vector lies in the contour plane) ||| State flag = 1 i.e. normal processing algorithm |
| | then | else || |
| | State flag = 3, i.e. there is no solution | if (Endpoint of the shift vector lies in the processing plane) || |
| | | then | else | |
| | | State flag =2, i.e. contour is itself the solution | State flag =3, i.e. no solution | |

Fig. 27

Calculate the contour that is yielded from the section of the
processing plane with the body of rotation

| if (State flag = 1) | |
|---|---|
| then | else |
| #21 | #22 |
| The output contour which is the result of the section of processing plane and body of rotation is a general conic section. | The output contour consists of one or more circles, because normal vector of the processing plane and axis of rotation of the rotation body are parallel. |

Fig. 28

The output contour which is the result of the section of processing plane and body of rotation is a general conic section.

Retrieve the starting point ka of the generating contour from the input contour storer.

Examine whether the circular path of the starting point that arises when the point is rotated about the axis of rotation cuts the processing plane.

while (Retrieve, if present, next point from the input konius storer)

Examine whether the circular path of the new point cuts the processing plane if (Neither staring point nor end point cuts)
    — then ————————————————— else —————————— if (Starting point does not cut)
        ———————— then ———————————— else ————————

| Calculate the point on the straight line between starting and end point of the input contour which barely still cuts. This becomes the new starting point. | Calculate the point on the straight line between starting and end point of the input contour from which the processing contour is no longer cut. This becomes the new end point. | if (Curve of 2nd order degenerates)
        ——————————— then ————————————— else ————————

| Solution set (-menge) is again a vector in the processing plane. The starting and end point is transformed into the processing plane and thereupon issued into the output contour storer. | Solution set is a curve of 2nd order. This curve is linearized by the interpolation process between the transformed starting or end point within the processing plane. |

Set input contour starting point = input contour end point
    Set output contour starting point = output contour end point

Fig. 29

The output contour consists of one or more circles, because normal vector of the processing plane and axis of rotation of the body of rotation are parallel.

Retrieve the starting point ka of the generating contour from the input contour storer.

Examine whether the circular path of the starting point that arises when the point is rotated about the axis of rotation lies in the processing plane, or under it or over it.

while (Retrieve, if present, next point from the input konius (contour?) storer)

> Examine whether the circular path of the new point lies under/over or in the processing plane.
>
> if (Starting point cuts and end point does not cut or vice versa)
> ────then────────────────────────────else──
> Calculate the point on the vector that is given by the starting and end point which generates a circular path that lies in the processing plane.
>
> if (There is a circle that lies in the processing plane)
> ────then────────────────────────────else──
> Calculate circle radius, turning direction and opening angle and issues these magnitudes into the contour storer.
>
> Calculate input contour starting point = input contour end point

Fig. 30

Calculate the contour that is yielded from the section of the processing plane with the translation body.

```
switch (State flag)
                                                              oth
    Case 0
        ▓▓▓▓▓▓▓▓▓▓▓▓▓▓▓▓▓▓#24▓▓▓▓▓▓▓▓▓▓▓▓▓▓▓▓▓▓▓▓▓▓
        It is a matter of a normal lay, i.e. of lay of the
        translation body which leads to no singularities of
        the equations.

Case 1:
        ▓▓▓▓▓▓▓▓▓▓▓▓▓▓▓▓▓▓#25▓▓▓▓▓▓▓▓▓▓▓▓▓▓▓▓▓▓▓▓▓▓
        In this case, the normal vector of the processing
        plane is parallel to the shift vector of the
        translation body Case 2:
        ▓▓▓▓▓▓▓▓▓▓▓▓▓▓▓▓▓▓#25▓▓▓▓▓▓▓▓▓▓▓▓▓▓▓▓▓▓▓▓▓▓
        The processing plane is parallel to the plane in
        which the generating contour of the translation body
        lies, i.e. the generating contour is transformed into
        the processing plane by the parallel shift.

default:
        no solution set (menge)
```

Fig. 31

It is a matter of a normal lay, i.e. of a lay of the transformation body that leads to no singularities of the equations.

Retrieve the starting point ka of the generating contour from the input contour storer.

Examine whether the vector of the starting point that arises when the point corresponding to the shift vector is shifted cuts the processing plane.

while (Retrieve, if present, next point from the input contour storer)

Examine whether the vector of the new point cuts the processing plane.

if (Neither starting nor ending point cuts)

then ──────────────── else ────────────────
　　if (Starting point does not cut)
　　then ──────────── else ────────────

| Calculate the point on the straight line between the starting and end point of the input contour which barely still cuts. This becomes the new starting point. | Calculate the point on the straight line between starting and end point on the input contour from which the processing plane is no longer cut. This becomes the new end point. |

Calculate the section point with the processing plane and issue the point into the output contour storer.

Set input contour starting point = input contour ending point

Fig. 32

In this case the normal vector of the processing plane is parallel to the shift vector of the translation body.

```
Retrieve the starting point ka of the generating contour from the input
contour storer.

Examine whether the vector of the starting point that arises when the
point is shifted in correspondence to the shift vector lies in/under or
over the processing plane.

while (Retrieve, if present, next point from the input
        contour(?) storer)

Examine whether the vector of the new point lies in the processing
    plane, or above or under it.

if (A section point with the processing plane exists)
                            ─then─                              ─else─
        Calculate the puncture point of the vector through the
        processing plane and issue the point(s) into the output
        contour storer.

Set input contour starting point = input contour ending point
```

Fig. 33

The processing plane is parallel to the plane in which the generating contour of the translation body lies, i.e. the generating contour is transformed into the processing plane by parallel shifting.

```
while (Retrieve, if present, all points from the input
        contus (contour?) storer)

Calculate the parallel shift of the point from the contour
        plane into the processing plane.
```

METHOD AND APPARATUS FOR MACHINING WORKPIECES WITH NUMERICALLY CONTROLLED MACHINES

REFERENCE TO RELATED APPLICATIONS

The disclosures of the following copending applications assigned to the assignee of the present application and filed concurrently herewith are specifically incorporated by reference:

"Method and Apparatus for Ascertaining Tool Path Contours Approximating Curved Contour Intersection Lines in Numerically Controlled Machines", by Klaus-Dieter Körner U.S. Ser. No. 07/765,127 pending; and "Method and Apparatus for Ascertaining Tool Path Contours in Numerically Controlled Machines", by Norbert Vollmayr U.S. Ser. No. 07/765,377 pending.

BACKGROUND OF THE INVENTION

1. Field of the Invention

The invention relates to a method and apparatus for machining workpieces, and more particularly, a method and apparatus for accurately and simply creating complex bodies from primitives wherein tool corrections have been incorporated.

2. Description of the Prior Art

In numerically controlled (NC) machine tools, data for producing a workpiece from a workpiece blank is derived in the form of tool path data by means of an NC program. The tool path data produces a tool path contour which differs from the desired contour of the workpiece. The difference is due to the tool radius. More specifically, the NC machine operates the tool based upon the center point of the tool path contour. When the tool is moved along the tool path contour, the actual cutting, drilling or other operation performed by the tool occurs at a certain distance from the tool path contour, namely the tool radius. Thus, if a workpiece having the desired workpiece contour is to be created, the tool must be moved according to the tool path contour. The tool path contour will often be referred to as the corrected contour throughout the remainder of the specification.

Often, the workpiece to be produced by the NC machine is a complex body formed by various shapes. It is often difficult to define such a complex body and determine the intersection line contour or workpiece contour between the workpiece and an applicable machining plane. In addition, correcting the workpiece contour for the tool radius so that a particular tool will create the desired workpiece, taking into account possible collisions with a given accuracy, is a complex task requiring a great deal of calculation. The amount of computer capacity and memory capacity needed is thus correspondingly high. To perform such calculations, additional hardware and software are necessary on the NC control computer. These include special arithmetic processors, for instance, as well as geometric methods and display methods for describing free-form surfaces.

It is known that workpieces having complex shapes can often be created by combining primitives such as cylinders, rectangles and spheres using set theory operations. In addition, relatively complex body contours can be put together from simple contour parts such as circles and rectilinear lines. The tool radius corrections can be carried out easily with these simple contours. It is problematic, however, to ascertain the resultant tool path from the various corrected contours, since overlapping occurs when the various corrected contours are put together. For instance, U.S. Pat. No. 4,868,761 (Hayashi), which corresponds to German Published, Non-Examined Patent Application 36 08 438, discloses a method of calculating free, curved edges for manufacture by means of numerically controlled machines by means of computer-aided design (CAD) and computer-aided manufacture (CAM). In addition, set theory, also known as Boolean operation, is used to combine simple mathematically definable bodies to form a complex body. The function of defining a shape, however, is completely separate from the function of determining the geometric location of a tool. The latter is the task of numerical control.

An object of the present invention is to provide a method and apparatus of machining workpieces in a simple manner.

A further object of the present invention provides a method and apparatus for ascertaining tool path contours that produce a workpiece having desired workpiece contours.

Further objects and advantages will become apparent from the following description and the accompanying drawings.

SUMMARY OF THE INVENTION

A method and apparatus for machining workpieces by linking workpiece blank data with tool path data with the aid of a numerical control. A workpiece contour is formed by combining mathematically defined base bodies. More specifically, two-dimensional contours are corrected with tool radius data stored in memory to create corrected 2-D contours. Corrected three-dimensional base bodies are generated from the data for corrected two-dimensional contours by either translating or rotating the two-dimensional contours. The data of the three-dimensional base bodies is stored in memory. The data from said corrected three-dimensional base bodies is linked with data from assembled bodies oriented arbitrarily in space stored in memory to create surfaces equidistant from the surface of the workpiece.

BRIEF DESCRIPTION OF THE DRAWINGS

Further objects and advantages of this invention will become more apparent and readily appreciated from the following detailed description of the present invention, taken in conjunction with the accompanying drawings, of which:

FIG. 3A illustrates a 2-D contour;

FIG. 3B illustrates a 3-D object generated from the 2-D contour of FIG. 3A;

FIG. 3C illustrates a corrected 2-D contour;

FIG. 3D illustrates a corrected 3-D objected generated from the corrected 2-D contour of FIG. 3C;

FIGS. 8a and 8b are a subroutine for inputting parameters;

FIG. 9 is a subroutine for ascertaining basic bodies from the Boolean linkage equation;

FIG. 10 is a subroutine to calculate intersecting contours;

FIG. 11 is a subroutine to calculate global parameters for contour projection;

FIG. 12 is a subroutine to generate basic bodies by translation;

FIG. 13 is a subroutine to calculate the contour from a body generated by rotation;

FIGS. 14a and 14b are a subroutine for calculating the intersection of the machining plane with a body generated by rotation;

FIG. 15 is a subroutine for calculating the intersection of the machining plane with a body generated by rotation where the axis of rotation is parallel to a normal vector of the inching plane;

FIG. 16 is a subroutine for generating the intersection of a machining plane and a body generated by translation;

FIG. 17 is a calculation of a normal location;

FIG. 18 is a subroutine for generating the intersection of a machining plane and a body generated by translation where the displacement vector is parallel to a vector normal to the machining plane;

FIG. 19 is a subroutine for generating the intersection of a machining plane and a body generated by translation where the displacement vector is parallel to the machining plane;

FIGS. 20a and 20b are a subroutine for machining height lines by scanning line method;

FIG. 21 is a subroutine for a test Boolean linkage equation;

FIG. 22 is a subroutine for testing a current point with the number of the page node;

FIG. 23 is a subroutine for testing the linkeage state;

FIG. 24 is a subroutine for generating machining layer line by scanning line method;

FIG. 25 is a subroutine for calculating global parameter for contour projections;

FIG. 26 is a subroutine for body generated by translation;

FIG. 27 is a subroutine for calculating the contour resulting from the intersection of the machining plane by a body generated by rotation;

FIG. 28 is a subroutine for generating an output contour;

FIG. 29 is a subroutine for generating an output contour when the axis of rotation of the body is parallel to a normal vector to the machining plane;

FIG. 30 is a subroutine for generating an output contour that results from the intersection of a machining plane and a body generated by translation;

FIG. 31 is a subroutine for generating a normal location;

FIG. 32 is a subroutine for generating intersection where the displacement vector of the body generated by translation is parallel to a normal vector of the machining plane; and FIG. 33 is a subroutine for generating a contour by transforming a contour into the machining plane by parallel displacements.

DETAILED DESCRIPTION OF THE PREFERRED EMBODIMENTS

Figure 1:
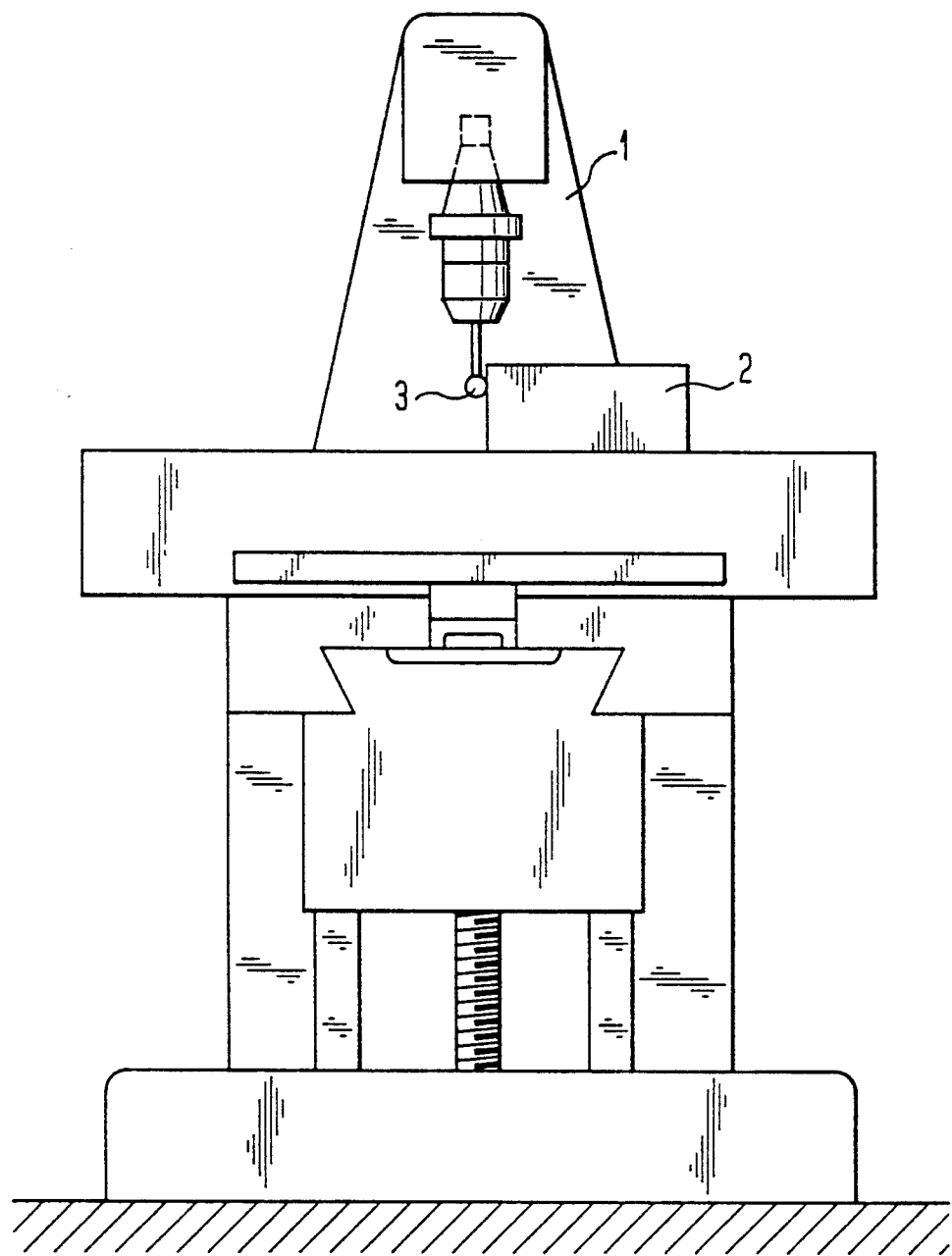
FIG. 1 illustrates a conventional numerically controlled milling machine.

FIG. 1 illustrates a conventional numerically controlled milling machine 1 used to carry out the method according to the present invention. A workpiece to be machined is represented by a workpiece blank 2. A tool serving to machine the workpiece blank 2 is represented by a spherical cutter 3. Milling machines, workpiece blanks and spherical cutters are all well known to those skilled in the art.

Figure 2A:
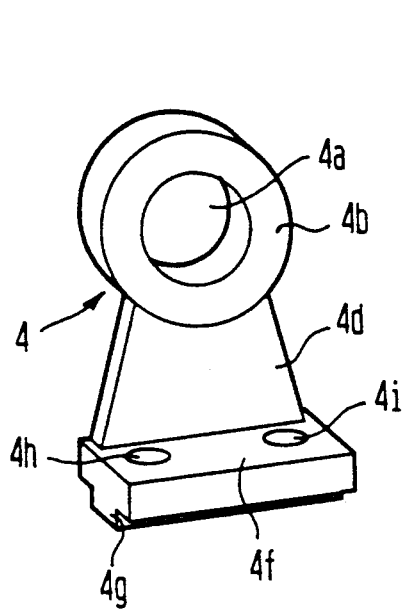
FIG. 2A illustrates a bearing block.
Figure 2B:
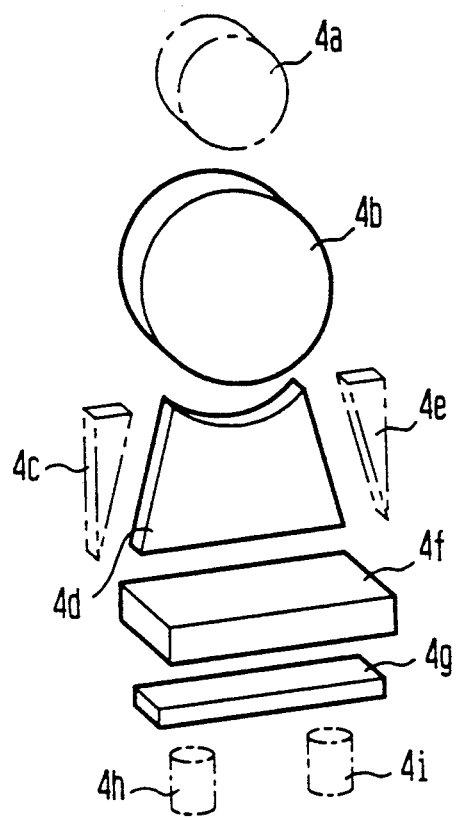
FIG. 2B illustrates the bearing block of FIG. 2A dismantled into its corresponding base bodies.

FIG. 2A illustrates a bearing block 4. The bearing block 4 of FIG. 2A is a relatively complex object, however, it is capable of being defined by simple base bodies 4a-4i, also known as primitives, as shown in FIG. 2B. Set theory is used to properly combine these base bodies to create the complex body of FIG. 2A. Specifically, by means of set theory operations, also known as Boolean operations, the bearing block 4 can be derived from the base bodies 4a-4i. (see U.S. Pat. No. 4,868,761 which describes this in relation to CAD systems).

More specifically, to create the bearing block 4, a bore 4a in the shape of a round column is subtracted from another round column (not shown) having a greater radius than the bore 4a to create a hub 4b. A web 4d comprising a trapezoidal column is created by subtracting two triangular columns 4c and 4e from a rectangular column (not shown). To combine the hub 4b with the web 4d, the hub 4b is subtracted from the web 4d. Added to the above simple base bodies is a base plate 4f comprising a rectangular column and a rectangular column strip 4g. Two screw holes 4h and 4i, embodied by round columns, are subtracted from the base plate 4f and column strip 4g. It is clear from this example that relatively complicated bodies, like the bearing block 4, can be assembled from simple, mathematically determinable base bodies 4a-4i.

FIGS. 3A-3D illustrate the generation of three-dimensional (3-D) and corrected 3-D base bodies respectively. In FIG. 3A, a 2-D contour in the form of a rectangle 5a is illustrated. To create a 3-D rectangle 5b of FIG. 3B, the rectangular column 5a is translationally shifted by a certain amount in the direction of a vector V. The base bodies described in detail with respect to FIG. 2B can be created by either translating or rotating 2-D contours. The rectangular column 5b was created by translating rectangle 5a along vector V.

Other bodies can be generated by rotating a 2-D contour about an axis. This has not been illustrated because it is known that a circular ring of rectangular cross section is created if rectangle 5a is rotated about an axis outside its contour. With respect to FIG. 2A, the hub 4b could be defined in this way instead of subtracting round column 4a from a larger round column as described above with respect to FIG. 2B.

To manufacture bodies such as a rectangular column 5b, other base bodies or combinations thereof from a workpiece blank 2, a tool such as a spherical cutter 3 must be moved along a tool path contour. The tool path contour is equidistant from the desired workpiece contour. The distance between the tool path contour and the workpiece contour is determined by the radius of the spherical cutter 3 as discussed above.

When complex bodies such as the body illustrated in FIG. 2A, are assembled from simple base bodies or primitives as shown in FIG. 2B, the correction calculations made to incorporate the tool radius become relatively complicated and are subject to error. Specifically, the tool path contour determined by the corrected path data does not necessarily coincide with the intersection lines of the assembled base bodies, therefore, the tool path contour is not necessarily equidistantly located from the desired workpiece contour. This results in a workpiece having a contour not identical to the desired workpiece contour.

To simplify ascertaining the tool path contour or its path data, a tool path correction is performed on the simple 2-D contour 5a as shown in FIG. 3C. The resulting tool path contour is illustrated by dot-dash lines and forms a corrected 2-D contour 5c. To create a corrected 3-D body, the corrected 2-D contour is shifted translationally along a vector V resulting in the corrected 3-D body 5d shown in FIG. 3D. The surfaces of the corrected body 5d describe surfaces equidistant from the surfaces of the base body 5b. As already described above, the distance between the surfaces of the base body 5b and the corrected base body 5d is determined by the tool radius.

Corrected base bodies such as the one described above are used to create the resultant body representing the workpiece to be manufactured. This eliminates the potential disadvantage that the tool path contour may not coincide with the intersection lines of the desired workpiece contour which will be referred to again hereinafter with respect to FIG. 5.

Intersection lines formed by the intersection of the corrected surfaces of the base bodies and an applicable machining plane are calculated. For base bodies generated by translation, the intersection lines are rectilinear segments. For base bodies generated by rotation the intersection lines are curves of general conical or cylindrical sections. For curved intersection lines it is useful to linearize the sequence of the generated curves, taking into account the resolution dictated by the machine. A suitable method for this purpose will be described in detail with respect to FIGS. 6A and 6B. In addition, copending application "Method and Apparatus for Ascertaining Tool Path Contours Approximating Curved Contour Intersection Lines in Numerically Controlled Machines", by Klaus-Dieter Körner U.S. Ser. No. 07/765,127, referred to earlier describes the linearization of such curves. This application is incorporated herein by reference. Generally, interpolation with 3-D rectilinear segments is generated as a function of the actual curvature of the curve. This assures that only as many rectilinear segments as are necessary to not exceed the maximum error are generated. This greatly reduces the quantity of data and thus economizes the amount of memory space required. The sequence of rectilinear segments calculated in this way produces the corrected sectional contour.

The corrected resultant workpiece is obtained by performing set theory operations using points located on the intersection lines or periphery of the corrected base bodies. A point located on the periphery of such a base body will either become a point located on the intersection line of the resulting workpiece contour or it will not.

Figures 4A, 4B, 4C:
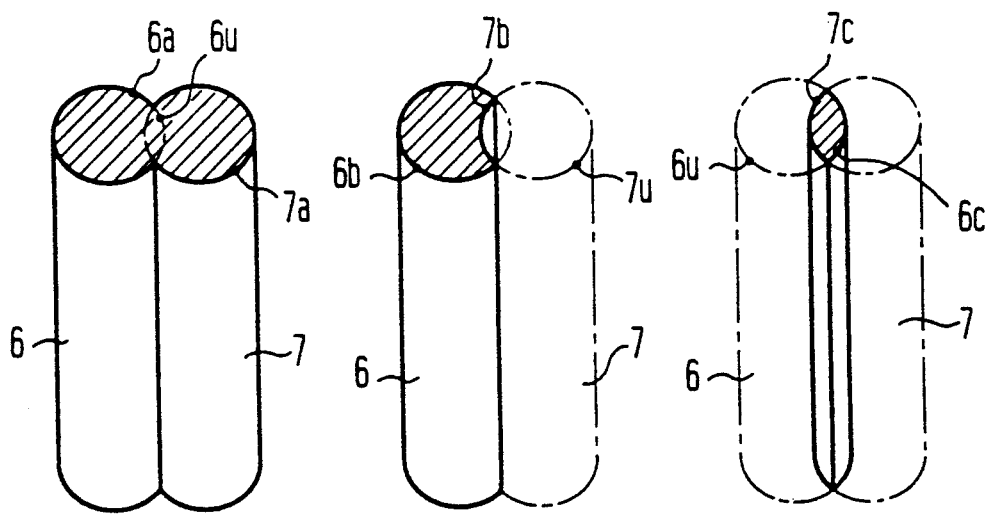
FIG. 4A illustrates the union of two cylindrical base bodies.
FIG. 4B illustrates the subtraction of one cylindrical base body from another cylindrical base body.
FIG. 4C illustrates the intersection of two cylindrical base bodies.

In FIGS. 4A-4C, three basic set theory operations will be explained in terms of two inter. nested cylinders 6 and 7. To manufacture a complex body resulting from a set theory operation, i.e. a resultant body, it is important to determine whether a point located on the periphery of a base body will become a valid point located on the periphery of the resultant body. The answer will of course depend upon the set theory operation performed.

In FIG. 4A the resultant body comprises the union (∪) of the cylinders 6 and 7. To perform the union operation, valid peripheral points result whenever a point is located on the periphery of one cylinder and outside the periphery of the other cylinder. If these two conditions are not satisfied, then the point is not a valid point and thus does not become a point on the periphery of the resultant body. For example, point 6a is a peripheral point on cylinder 6 and is located outside cylinder 7 and is therefore a valid point and becomes a peripheral point on the resultant body. Similarly, point 7a is a peripheral point of cylinder 7 and is located outside cylinder 6 and is therefore a valid point. On the other hand, point 6u is located on the periphery of cylinder 6 but it is located inside cylinder 7 and thus is not a valid point under the rules for performing the union operation. Thus, point 6u does not become a peripheral point on the resultant body. The resultant body is shown in bold line in FIG. 4A.

In FIG. 4B the resultant body comprises the difference (\) between the cylinders 6 and 7 with cylinder 7 subtracted from cylinder 6. To perform the difference operation, valid peripheral points result whenever a point is located on the periphery of cylinder 6 and outside cylinder 7 or a point is located on the periphery of cylinder 7 and inside cylinder 6. Point 6b is a peripheral point of cylinder 6 and is located outside cylinder 7 and therefore it is a valid peripheral point. Point 7b is a peripheral point of cylinder 7 and is located inside cylinder 6 and thus it too is a valid peripheral point. Point 7u, on the other hand, is not a valid point, because although it is located on the periphery of cylinder 7, it is located outside cylinder 6. The resultant body is shown in bold line in FIG. 4B.

If cylinder 6 is to be subtracted from cylinder 7, the above described operations are altered so that valid peripheral points for the resultant body are located on the periphery of cylinder 7 and outside cylinder 6 or a point is located on the periphery of cylinder 6 and inside cylinder 7.

In FIG. 4C the intersection (∩) of cylinders 6 and 7 is performed. To perform the intersection operation, valid peripheral points for the resultant body result when a point is located on the periphery of one cylinder and inside the other cylinder. Point 6c is a peripheral point of cylinder 6 and is located inside cylinder 7 and thus is a valid peripheral point of the resultant body. Point 7c is a peripheral point of cylinder 7 and is located inside cylinder 6 and it too is a valid peripheral point. Point 6u is not a valid point because although it is located on the periphery of cylinder 6, it is located outside cylinder 7. The resultant body is shown in bold line in FIG. 4C.

In addition to the set theory operations described above, points located at the intersection of boundaries are always valid points.

Figure 5:
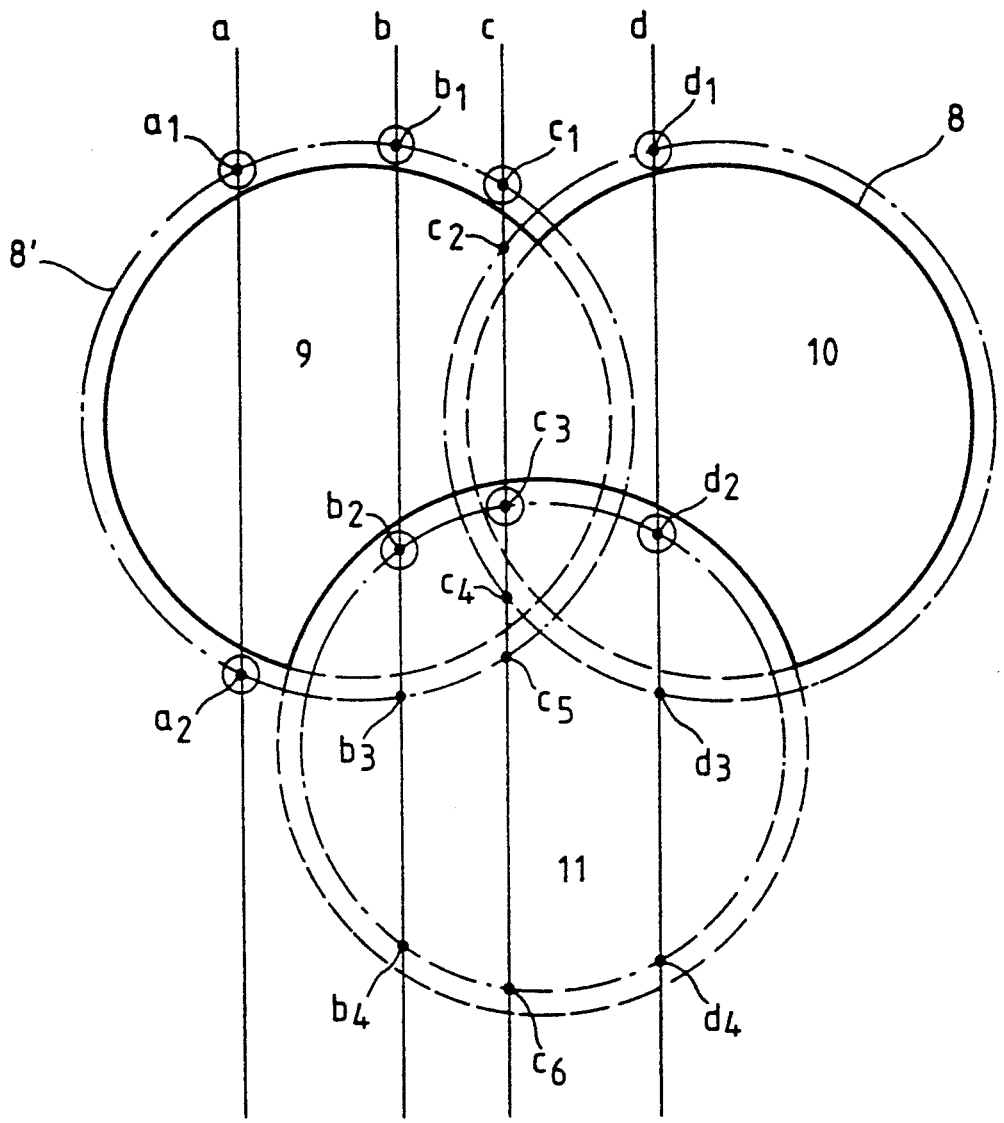
FIG. 5 illustrates a milling cutter path in plan view.

In FIG. 5, a plan view on a workpiece 8 and its corrected body 8' is shown. The workpiece 8 comprises three base bodies in the form of cylinders. The plan view illustrates an intersection contour between the surface of the workpiece 8 and the applicable machining plane. In addition, the intersection contour of the corrected workpiece 8' and the applicable machining plane is shown. The tool path contour coincides with the intersection contour of the corrected body 8'. The cylinders are identified by reference numerals 9, 10 and 11. Cylinders 9 and 10 represent positive cylinders to be summed together while cylinder 11 is a negative cylinder which must be subtracted from the sum of cylinders 9 and 10 in composing the workpiece 8. These cylinders can be solid or hollow.

To produce workpiece 8, cylinders 9, 10 and 11 are corrected and linked by set theory algebra to ascertain the corrected cutter path data. In order to generate the corrected base bodies, it must first be determined whether the applicable base body is a positive body or a negative body. In FIG. 5, the positive cylinders 9 and 10 have corrected contours having a radius greater than the radius of the cylinders 9 and 10. For negative cylinder 11, the corrected contour has a smaller radius than the radius of cylinder 11. By set theory algebraic operations, the valid peripheral points for the cutter paths are ascertained as described below.

To ascertain the valid peripheral points, auxiliary lines are placed in a particular matrix over the corrected body 8'. For the sake of clarity, only four auxiliary lines a, b, c, d are shown. The sequence of valid peripheral points corresponds to the cutter path that generates the contour of the work piece 8.

The basic condition of the set operation involved for the three cylinders is the union of cylinders 9 and 10 from which the cylinder 11 is subtracted. The set operation is represented by the equation:

$$(9 \cup 10) \setminus 11.$$

The determination of valid or invalid peripheral points is always carried out on the contours of the corrected bodies 9, 10 and 11. The method of determining whether a point is valid or not is analogous to the explanation given with respect to FIGS. 4A, 4B and 4C.

The first step in performing the operation $(9 \cup 10)/11$ is to determine whether a point is a valid peripheral point of $9 \cup 10$. This was described with respect to FIG. 4A. The second step is to determine whether the point resulting from the union of cylinders 9 and 10 is a valid point located on the periphery of body resulting from the difference between cylinder 11 and the union of cylinders 9 and 10. A valid point resulting from the second step will be a point located on the periphery of the resulting body.

The following symbols and their definitions are used in the tables:

$R_i$ = peripheral point located on cylinder i
$I_i$ = point located inside cylinder i
$A_i$ = point located outside cylinder i
$R_{(9 \cup 10)}$ = peripheral point located on union of cylinders 9 and 10
$I_{((9 \cup 10)}$ = point located inside the union of cylinders 9 and 10
$A_{(9 \cup 10)}$ = point located outside the union of cylinders 9 and 10
$\circledR_{((9 \cup 10) \setminus 11)}$ = valid peripheral point of resultant body defined by equation $(9 \cup 10) \setminus 11$
$I_{((9 \cup 10) \setminus 11)}$ = point located inside the resultant body
$A_{((9 \cup 10) \setminus 11)}$ = point located outside the resultant body Auxiliary line "a" intersects the corrected cylinder 9 at point a'. The point $a_1$ is the peripheral point of cylinder 9, ($R_9$), and is located outside of cylinder 10, ($A_{10}$), thus, $a_1$ is valid for the union set $9 \cup 10$. The following particulars apply, $a_1$ is the peripheral point of the union set $9 \cup 10$, ($R_{(9 \cup 10)}$) and is located outside of cylinder 11, ($A_{11}$), accordingly, $a_1$ is a valid peripheral point for the differential quantity $(9 \cup 10) \setminus 11$ as well.

Expressed in table form:

| location of the point on corrected bodies | location of the point on resultant body |
|---|---|
| $a_1 = R_9; A_{10}$ | $R_{(9 \cup 10)}$ |
| $a_1 = R_{(9 \cup 10)}; A_{11}$ | $\circledR_{((9 \cup 10) \setminus 11)}$ |
| $a_2 = R_9; A_{10}$ | $R_{(9 \cup 10)}$ |
| $a_2 = R_{(9 \cup 10)}; A_{11}$ | $\circledR_{((9 \cup 10) \setminus 11)}$ |

Both intersection points $a_1$ and $a_2$ are accordingly valid peripheral points, which the cutter may drive up against. Valid peripheral points are identified in the tables and in FIG. 5 with a concentric circle around the applicable point which is intended to represent a spherical cutter.

Analogously, for an auxiliary line b, the following applies:

| location of a point on corrected bodies | location of a point on resultant body |
|---|---|
| $b_1 = R_9; A_{10}$ | $R_{(9 \cup 10)}$ |
| $b_1 = R_{(9 \cup 10)}; A_{11}$ | $\circledR_{((9 \cup 10) \setminus 11)}$ |
| $b_2 = I_9; A_{10}$ | $I_{(9 \cup 10)}$ |
| $b_2 = R_{11}; I_{(9 \cup 10)}$ | $\circledR_{(11 \setminus (9 \cup 10))}$ |
| $b_3 = R_9; A_{10}$ | $R_{(9 \cup 10)}$ |
| $b_3 = R_{(9 \cup 10)}; I_{11}$ | $I_{(11 \setminus (9 \cup 10))}$ |

Since point $b_3$ is not valid for all conditions, it does not represent a valid peripheral point for machining.

| location of a point on corrected bodies | location of a point on resultant body |
|---|---|
| $b_4 = A_9; A_{10}$ | $A_{(9 \cup 10)}$ |
| $b_4 = R_{11}; A_{(9 \cup 10)}$ | $A_{((9 \cup 10) \setminus 11)}$ |

Accordingly, in auxiliary line b, only the peripheral points $b_1$ and $b_2$ are valid cutter path points.

For auxiliary line c, the following applies:

| location of a point on corrected bodies | location of a point on resultant body |
|---|---|
| $c_1 = R_9; A_{10}$ | $R_{(9 \cup 10)}$ |
| $c_1 = R_{(9 \cup 10)}; A_{11}$ | $\circledR_{((9 \cup 10) \setminus 11)}$ |
| $c_2 = R_{10}; I_9$ | $I_{(9 \cup 10)}$ |
| $c_2 = I_{(9 \cup 10)}; A_{11}$ | $I_{((9 \cup 10) \setminus 11)}$ |
| $c_3 = I_9; I_{10}$ | $I_{(9 \cup 10)}$ |
| $c_3 = R_{11}; I_{(9 \cup 10)}$ | $\circledR_{(11 \setminus (9 \cup 10))}$ |
| $c_4 = R_{10}; I_9$ | $I_{(9 \cup 10)}$ |
| $c_4 = I_{(9 \cup 10)}; I_{11}$ | $I_{((9 \cup 10) \setminus 11)}$ |
| $c_5 = R_9; A_{10}$ | $R_{(9 \cup 10)}$ |
| $c_5 = R_{(9 \cup 10)}; I_{11}$ | $I_{((9 \cup 10) \setminus 11)}$ |
| $c_6 = A_9; A_{10}$ | $A_{(9 \cup 10)}$ |
| $c_6 = R_{11}; A_{(9 \cup 10)}$ | $A_{((9 \cup 10) \setminus 11)}$ |

Accordingly, in auxiliary line c the peripheral points $c_1$ and $c_2$ are valid cutter path points.

For auxiliary line d, the following

| location of a point on corrected bodies | location of a point on resultant body |
|---|---|
| $d_1 = R_{10}; A_9$ | $R_{(10 \cup 9)}$ |
| $d_1 = R_{(10 \cup 9)}; A_{11}$ | $\circledR_{((10 \cup 9) \setminus 11)}$ |
| $d_2 = A_9; I_{10}$ | $I_{(9 \cup 10)}$ |
| $d_2 = R_{11}; I_{(10 \cup 9)}$ | $\circledR_{(11 \setminus (9 \cup 10))}$ |
| $d_3 = R_{10}; A_9$ | $R_{(10 \cup 9)}$ |

-continued

| location of a point on corrected bodies | location of a point on resultant body |
|---|---|
| $d_3 = R_{(10 \cup 9)}; I_{11}$ | $I_{(11 \setminus (10 \cup 9))}$ |
| $d_4 = A_9; A_{10}$ | $A_{(9 \cup 10)}$ |
| $d_4 = R_{11}; A_{(10 \cup 9)}$ | $A_{((9 \cup 10) \setminus 11)}$ |

Upon observing the more heavily drawn boundary line of workpiece 8, it is seen that all the peripheral points $a_1$, $a_2$, $b_1$, $b_2$, $c_1$, $c_2$, $d_1$ and $d_2$, recognized as valid points, are located on the corrected contour 8', or in other words equidistantly from the workpiece contour 8, the distance of which corresponds to the radius of the spherical cutter 3 of FIG. 1.

Although only four auxiliary lines were shown, the location of the auxiliary lines is arbitrary and the auxiliary lines should be located close together in order to create a continuously extending cutter path.

Figure 6A:
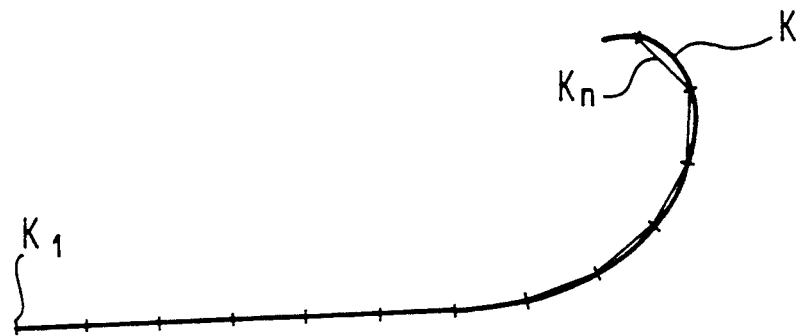
FIG. 6A illustrates a cutter path contour.

Now the aforementioned linearizing of a curved intersection line will be explained, in conjunction with FIGS. 6A and 6B. In FIG. 6A, a curved course of a contour K is shown, which according to the prior art is generated approximately by the milling cutter by means of rectilinear segments $K_i$ where $i = 1 \ldots n$ of a fixedly defined grid pattern. Since the length of the rectilinear segments is fixed, the deviation in the actually produced contour from the desired or ideal contour K increases with the increasing curvature of the ideal contour K.

Figure 6B:
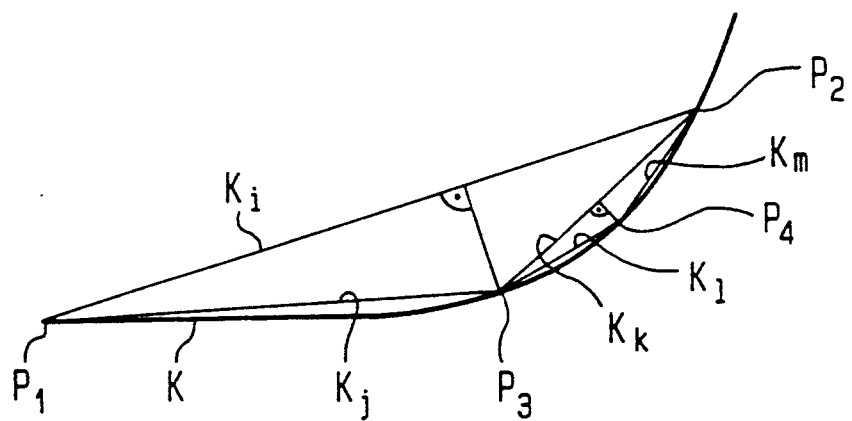
FIG. 6B illustrates an enlarged segment of the cutter path contour shown in FIG. 6A.

This deviation is illustrated with particular clarity in the exaggerated view of FIG. 6B. The contour K is produced with rectilinear segments, of which only the segment $K_i$ is shown. A milling cutter (not shown) would join points $P_1$ and $P_2$ of contour K along this segment $K_i$ by means of its cutter path. To improve the approximation of the cutter path to the desired contour K, a vertical is dropped from the rectilinear segment $K_i$ onto the contour K and the location of the greatest deviation is ascertained. The point of intersection of the contour K and the vertical defines a point $P_3$. The NC control, with the aid of which point $P_3$ was ascertained, defines new rectilinear segments by the rectilinear lines $K_j$ and $K_k$, with which points $P_1$ and $P_3$ as well as $P_3$ and $P_2$ are connected. It is evident that the linearizing by the new rectilinear lines $K_j$ and $K_k$ has already brought about a markedly better approximation of the cutter path to the desired contour K. If the same procedure is employed with the new rectilinear segment $K_k$, then the resultant rectilinear segments $K_l$ and $K_m$ provide a better approximation of the desired contour K. It can be seen that with this method for curvature-dependent linearizing, the rectilinear segment length also becomes curvature-dependent. With this method, the path of the cutter is made maximally conforming to the ideal contour K.

Figure 7:
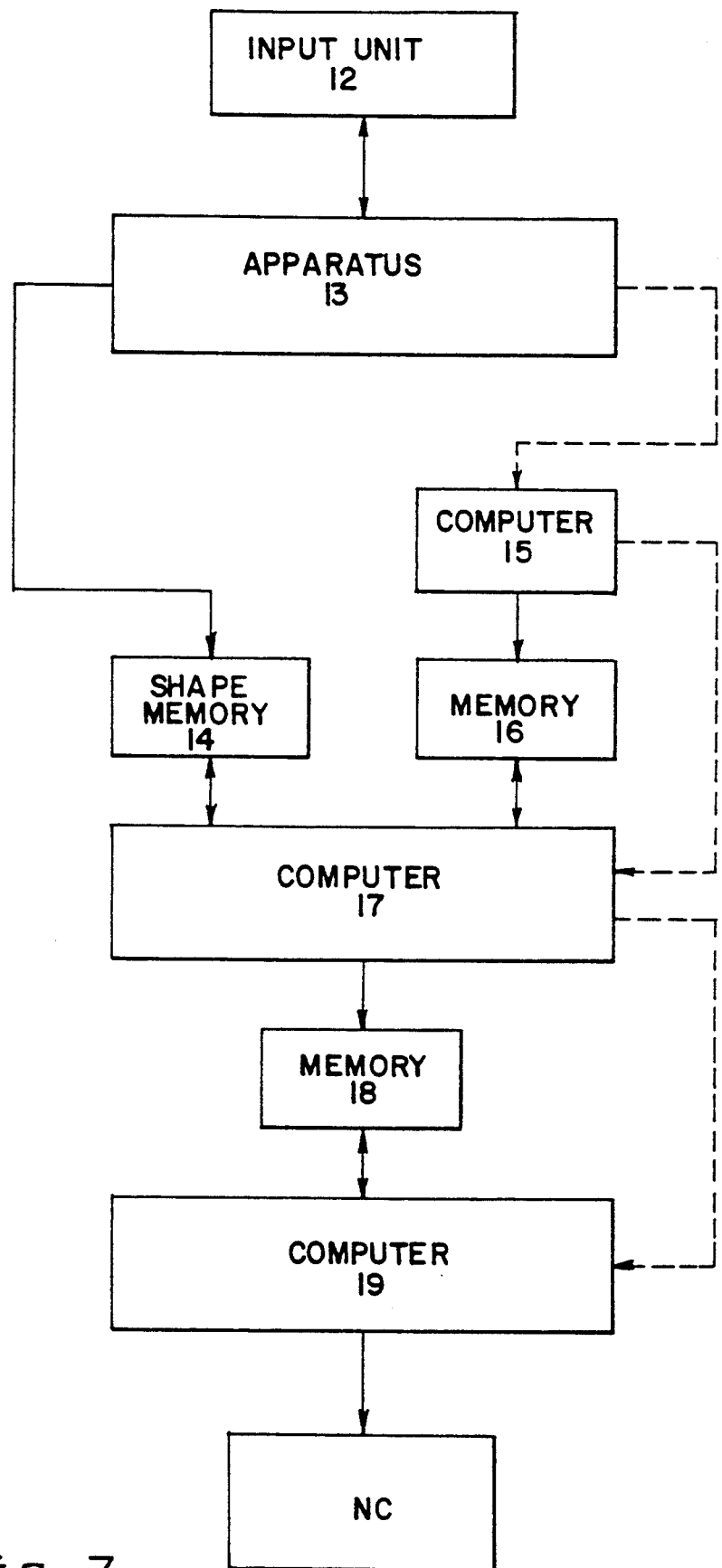
FIG. 7 illustrates the functions performed by various components of an apparatus and method of machining workpieces with numerically controlled machines in accordance with the present invention.

FIG. 7, illustrates the functions performed of various components of an apparatus and method of machining workpieces with numerically controlled machines in accordance with the present invention. Input unit 12 provides an interface to the user so that data can be entered to operate a numerically controlled machine. In apparatus 13, the machining parameters, dimensions of the workpiece blank and the machining plane referred to with respect to FIG. 5 and the cutting conditions are defined and checked.

Memory 14 stores the three-dimensional body defined by the user, for example, the bearing block 4 shown in FIG. 2A. Computer 15 dissects the whole bodies in accordance with FIG. 2A, for example, into two-dimensional base bodies such as those shown in FIG. 3A. The base bodies are corrected to form two-dimensional corrected base body data of FIG. 3C. Memory 16 stores the corrected two-dimensional base body data.

Computer 17 calculates the machining plane as described with respect to FIG. 5 from the data stored in the shape memory 14 and the corrected two-dimensional base body data received from the memory 16. Memory 18 stores the combined and corrected 2-D base bodies data for the appropriate machining plane as calculated by computer 17. Computer 19 carries out the set theory algorithms, i.e. Boolean operations, with the generated intersection lines stored in the memory 18. The data calculated by computer 19 is sent to the NC machine as tool path data.

FIGS. 8-33 illustrate a flow chart in the form of NASSI-Shneider diagrams for implementing the invention. During the development of the present invention, computers made by DEC-VMS were used. Later, when the invention is commercialized, numerical control systems using Motorola processors, for instance, of the kind used in personal computers will be used. In the flow chart, the most comprehensive application representing the present invention is marked "I", while parts of the program representing copending application U.S. Ser. No. 07/765,377 (which is incorporated herein by reference) are marked "II" and parts of the program representing copending application U.S. Ser. No. 07/765,127 are marked "III". The diagrams for II and III are included in I. Briefly, FIG. 8 is a subroutine for inputting parameters.

In FIG. 9 all incident hollow and solid bodies (basic bodies) from the Boolean linkage equation are ascertained.

In FIG. 10 the intersecting line contours of all basic bodies defined by time, location and correct generatrix, with the current machining plane are calculated.

In FIG. 11 global parameters for contour projection, such as solid angle of the primitive, location of the machining plane, etc., from the parameters of the primitive are calculated.

FIG. 12 relates to a body generated by translation.

In FIG. 13 the contour resulting from intersection of the machining plane by the body generated by rotation is calculated.

In FIG. 14 the output contour, which is the outcome of the intersection of the machining plane and the body generated by rotation, is a generalized conical section.

In FIG. 15 the output contour comprises one or more circles, because the normal vector of the machining plane and the axis of rotation of the body generated by rotation are parallel.

In FIG. 16 the output contour that results form the intersection of the machining plane by the body generated by translation.

In FIG. 17 this is a normal location, i.e. a location of the body generated by translation that does not lead to an singularities of the equation.

In FIG. 18 the normal vector of the machining plane is parallel to the displacement vector of the body generated by translation.

In FIG. 19 the machining plane is parallel to the plane in which the generating contour of the body generated by translation is located, i.e., the generating contour is transformed into the machining plane by parallel displacement.

In FIG. 20 machining of height lines is done by scanning line method.

In FIG. 21 a test Boolean linkage equation is tested.

In FIG. 22 a test of the current point with respect to the intersecting line of the basic body with the number of the page node is conducted.

In FIG. 23 a test of the linkage state based on the status of the succeeding left- and right-hand node and the status of the linkage operation is conducted.

In FIG. 24 a machining layer line is done by scanning line method.

In FIG. 25 global parameters for contour projection, such as solid angle of the primitive, location of the machining plane, etc., from the parameters of the primitive are calculated.

FIG. 26 relates to a body generated by translation.

In FIG. 27 the contour resulting from intersection of the machining plane by the body generated by rotation is calculated.

In FIG. 28 the output contour, which is the outcome of the intersection of the machining plane and the body generated by rotation, is a generalized conical section.

In FIG. 29 the output contour comprises one or more circles, because the normal vector of the machining plane and the axis of rotation of the body generated by rotation are parallel.

In FIG. 30 the output contour results from the intersection of the machining plane by the body generated by translation.

In FIG. 31 a normal location, i.e. a location of the body generated by translation that does not lead to any singularities of the equations is formed.

In FIG. 32 the normal vector of the machining plane is parallel to the displacement vector of the body generated by translation.

In FIG. 33 the machining plane is parallel to the plane in which the generating contour of the body generated by translation is located, i.e., the generating contour is transformed into the machining plane by parallel displacement.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A method for machining workpieces by linking workpiece blank data with tool path data comprising the steps of:
   a) providing two-dimensional contour data;
   b) providing tool radius data representing the radius of a tool used to machine the workpiece;
   c) correcting two-dimensional contour data with tool radius data to create corrected two-dimensional contour data;
   d) generating three-dimensional contour data from said corrected two-dimensional contour data;
   e) linking said corrected three-dimensional contour data by a set theory equation to define a desired part data;
   f) creating intersection contour data by intersecting said desired part data with a series of machining plane data, the intersection contour data defining a cutter path; and
   g) machining said workpiece along said cutter path.

2. A method according to claim 1 further comprising the step of linearizing curved sections of said intersection contour data in segments.

3. A method according to claim 2 further comprising the step of making the linearizing segments dependent on the intensity of said curvature.

4. A method according to claim 2 further comprising the step of limiting the number of segments by the allowable deviation of the linearized contour from said curved contour.

5. A method according to claim 1 further including the steps of:
   calculating intersection point data between the intersection contour data and a series of line data intersecting said intersection contour data.

6. A method for machining a workpiece with a tool to create a desired part comprising the steps of:
   providing a constructive geometric description of the desired part by linking at least two three-dimensional primitive bodies by a set theory equation;
   reducing said three-dimensional primitive bodies to two-dimensional contours;
   correcting the perimeter of each two-dimensional contour by the radius of the tool used to machine the workpiece to create corrected two-dimensional contours;
   generating corrected three-dimensional primitive bodies from said corrected two-dimensional contours;
   linking said corrected three-dimensional primitive bodies by the same set theory equation as in the initial step to create a corrected geometric description of the desired part;
   creating an intersection contour between the corrected geometric description of the desired part and one of a series of machining planes;
   generating machine tool position commands to direct said tool to follow said intersection contour; and
   machining said workpiece by moving the tool in accordance with the machine tool position commands.

7. A method according to claim 6 wherein the step of generating machine tool position commands comprises converting said intersection contour to numerical control machine code.

8. A method according to claim 6 wherein the step of correcting the two-dimensional contours includes increasing the perimeter of a two-dimensional contour for a positive body and decreasing the perimeter of a two-dimensional contour for a negative body.

9. A method according to claim 6 wherein said series of machining planes are parallel.

10. A method according to claim 6 wherein the machining planes are equidistantly spaced from one another.

11. A method according to claim 10 wherein the spacing of the series of planes is determined by the desired resolution of the machining path.

12. A method according to claim 6 wherein the step of generating machine tool position commands includes the steps of:
   determining intersection points between the intersection contour and a series of lines intersection said contour;
   determining whether each intersection point satisfies the same set theory equation as in the initial step; and labeling those intersection points that satisfy the set theory equation on valid peripheral points on said contour, said machine tool position commands defining a path containing said valid peripheral points to create the desired part.

13. A method according to claim 6 further including the step of creating an intersection contour for each one of the series of machining planes.

14. An apparatus for machining a workpiece to create a desired part comprising:

a movable tool to cut the workpiece along a calculated path; and a control system sending signals to said tool so as to move said tool along said calculated path, said control system further comprising a numerically controlled machine capable of running a routine for defining the desired part by linking at least two three-dimensional primitive bodies by a set theory equation; reducing the three-dimensional primitive bodies to two-dimensional contours; correcting the perimeter of each two-dimensional contour by the radius of the tool used to machine the workpiece; generating corrected three-dimensional primitive bodies from said corrected two-dimensional contours; linking said corrected three-dimensional primitive bodies by the same set theory equation used to define the desired part to create a corrected geometric description of the desired part; creating an intersection contour between the corrected geometric description of the desired part and one of a series of machining planes; generating machine tool position commands to direct said tool to follow said intersection contour; and machining said workpiece by moving the tool in accordance with the machine tool position commands.

15. An apparatus for machining a workpiece to create a desired part comprising:

a movable tool to cut the workpiece along a calculated path; and a control system sending signals to said tool so as to move said tool along said calculated path, said control system further comprising a numerically controlled machine capable of running a routine for providing two-dimensional contour data; providing tool radius data representing the radius of a tool used to machine the workpiece; correcting two-dimensional contour data with tool radius data to create corrected two-dimensional contour data; generating three-dimensional contour data; linking said corrected three-dimensional contour data by a set theory equation to define a desired part data; creating intersection contour data by intersecting said desired part data with a series of machining plane data, the intersection contour data defining a cutter path and machining said workpiece along said cutter path.

* * * * *

UNITED STATES PATENT AND TRADEMARK OFFICE
CERTIFICATE OF CORRECTION

PATENT NO. : 5,295,075
DATED : March 15, 1994
INVENTOR(S) : Klaus-Dieter Korner et al.

It is certified that error appears in the above-indentified patent and that said Letters Patent is hereby corrected as shown below:

In column 2, line 60, delete "objected" and substitute --object--.

In column 3, line 26, delete "inching" and substitute --machining--.

In column 3, line 41, delete "linkeage" and substitute --linkage--.

In column 3, line 45, delete "linkeage" and substitute --linkage--.

In column 4, line 42, after "bodies" insert --from two-dimensional (2-D) and corrected 2-D contours--.

In column 5, line 65, delete "inter nested" and substitute --internested--.

In column 7, line 37, delete "/" and substitute --\--.

In column 7, line 54, delete "((" and substitute --(--.

In column 7, line 64, delete "a'" and substitute --$a_1$--.

In column 8, line 59, delete "$C_2$" and substitute --$C_3$--.

UNITED STATES PATENT AND TRADEMARK OFFICE
CERTIFICATE OF CORRECTION

PATENT NO. : 5,295,075
DATED : March 15, 1994
INVENTOR(S) : Klaus-Dieter Korner et al.   Page 2 of 2

It is certified that error appears in the above-indentified patent and that said Letters Patent is hereby corrected as shown below:

In column 8, line 60, after "following" insert --observation applies:--.

In column 9, line 10, delete "$C_2$" and substitute --$C_3$--.

In column 10, line 55, delete "form" and substitute --from--.

In column 10, line 60, delete "an" and substitute --any--.

<u>In the Claims</u>

Col. 12, In claim 12, line 64, delete "intersection" and substitute --intersecting--.

Signed and Sealed this

Fourteenth Day of November, 1995

Attest:

BRUCE LEHMAN

Attesting Officer   Commissioner of Patents and Trademarks